US 10,364,719 B2

(12) United States Patent
Nakada et al.

(10) Patent No.: US 10,364,719 B2
(45) Date of Patent: Jul. 30, 2019

(54) EXHAUST GAS PURIFICATION SYSTEM, AND NOX PURIFICATION CAPACITY RESTORATION METHOD

(71) Applicant: ISUZU MOTORS LIMITED, Tokyo (JP)

(72) Inventors: Teruo Nakada, Yokohama (JP);
Takayuki Sakamoto, Fujisawa (JP);
Daiji Nagaoka, Kamakura (JP)

(73) Assignee: ISUZU MOTORS LIMITED, Tokyo (JP)

( * ) Notice: Subject to any disclaimer, the term of this patent is extended or adjusted under 35 U.S.C. 154(b) by 69 days.

(21) Appl. No.: 15/545,073

(22) PCT Filed: Jan. 19, 2016

(86) PCT No.: PCT/JP2016/051474
§ 371 (c)(1),
(2) Date: Jul. 20, 2017

(87) PCT Pub. No.: WO2016/117573
PCT Pub. Date: Jul. 28, 2016

(65) Prior Publication Data
US 2017/0362980 A1 Dec. 21, 2017

(30) Foreign Application Priority Data

Jan. 20, 2015 (JP) .................. 2015-008412

(51) Int. Cl.
*F01N 3/08* (2006.01)
*F01N 11/00* (2006.01)
(Continued)

(52) U.S. Cl.
CPC ........... *F01N 3/0885* (2013.01); *B01D 53/94* (2013.01); *B01D 53/9409* (2013.01);
(Continued)

(58) Field of Classification Search
CPC ...... F01N 3/0842; F01N 3/085; F01N 3/0871; F01N 3/0885; F01N 3/035; F01N 3/103;
(Continued)

(56) References Cited

U.S. PATENT DOCUMENTS 5,735,119 A 4/1998 Asanuma et al.
2009/0120069 A1 5/2009 Nagaoka et al.
(Continued)

FOREIGN PATENT DOCUMENTS

CN 101313131 A 11/2008
CN 101631937 A 1/2010
(Continued)

OTHER PUBLICATIONS

Machine Translation JP 2006-336518 Done Sep. 21, 2018.*
(Continued)

*Primary Examiner* — Patrick D Maines
*Assistant Examiner* — Dapinder Singh
(74) *Attorney, Agent, or Firm* — Procopio, Cory, Hargreaves & Savitch LLP

(57) ABSTRACT

There is provided an exhaust gas purification system including: a NOx storage-reduction catalyst that is provided in an exhaust system of an internal combustion engine to reduce and purify NOx in exhaust gas; a degree of deterioration estimation module 120 for estimating a degree of deterioration of the NOx storage-reduction catalyst; a regeneration control unit 100 for executing a regeneration process in which exhaust gas is enriched so as to restore a NOx storage capacity of the NOx storage-reduction catalyst; an interval setting module for setting a target interval from an end of the regeneration process to a start of the subsequent regeneration process by the regeneration control unit; and an interval target value correction module for correcting the target
(Continued)

interval based on the degree of deterioration that is estimated by the degree of deterioration estimation module.

7 Claims, 10 Drawing Sheets

(51) Int. Cl.

| | | |
|---|---|---|
| *B01D 53/94* | (2006.01) | |
| *F01N 3/20* | (2006.01) | |
| *B01D 53/96* | (2006.01) | |
| *F02D 41/04* | (2006.01) | |
| *B01J 38/04* | (2006.01) | |
| *F02D 41/02* | (2006.01) | |

(52) U.S. Cl.
CPC ......... *B01D 53/9495* (2013.01); *B01D 53/96* (2013.01); *B01J 38/04* (2013.01); *F01N 3/0814* (2013.01); *F01N 3/0842* (2013.01); *F01N 3/0871* (2013.01); *F01N 3/2066* (2013.01); *F01N 11/00* (2013.01); *F02D 41/0235* (2013.01); *F02D 41/04* (2013.01); *B01D 2255/91* (2013.01); *F01N 2430/06* (2013.01); *F01N 2550/03* (2013.01); *F01N 2900/0412* (2013.01); *F01N 2900/1614* (2013.01); *Y02T 10/47* (2013.01)

(58) Field of Classification Search
CPC ...... F01N 3/2013; F01N 3/0218; F01N 3/101; F01N 3/2006; F01N 3/2033; F01N 3/2066; F01N 3/0814; F01N 3/2026; F01N 2560/026; F01N 2560/027; F01N 2900/1612; F01N 2900/1614; F01N 2900/1622; F01N 2900/0412; F01N 2260/04; F01N 2330/02; F01N 2330/06; F01N 2330/10; F01N 2330/12; F01N 2610/02; F01N 11/00; F01N 13/009; F01N 13/0097

USPC ........................... 60/274, 277, 295, 299–301
See application file for complete search history.

(56) References Cited

U.S. PATENT DOCUMENTS

| | | | |
|---|---|---|---|
| 2010/0101217 A1 | 4/2010 | Ohashi et al. | |
| 2015/0298061 A1* | 10/2015 | Irisawa | ................ F01N 3/0842 |
| | | | 422/169 |
| 2015/0308363 A1* | 10/2015 | Choi | .................... F01N 3/2073 |
| | | | 123/703 |
| 2015/0315946 A1* | 11/2015 | Matsumoto | ........ B01D 53/9495 |
| | | | 422/119 |
| 2016/0061087 A1* | 3/2016 | Nagaoka | ............ B01D 53/9409 |
| | | | 73/114.75 |
| 2016/0222896 A1* | 8/2016 | Hotta | ................... F01N 3/0842 |

FOREIGN PATENT DOCUMENTS

| | | |
|---|---|---|
| EP | 1519021 A2 | 3/2005 |
| JP | H08-261041 A | 10/1996 |
| JP | 2006-336518 A | 12/2006 |
| JP | 2007-239581 A | 9/2007 |
| JP | 2008-202425 A | 9/2008 |

OTHER PUBLICATIONS

International Search Report and Written Opinion for PCT App No. PCT/JP2016/051474 dated Apr. 12, 2016, 8 pgs.
Extended European Search Report for related European Application No. 16740180.1, dated Jun. 12, 2018; 10 pages.
First Office Action for related CN App No. 201680006252.2 dated Nov. 6, 2018, 13 pgs.

* cited by examiner

EXHAUST GAS PURIFICATION SYSTEM, AND NOX PURIFICATION CAPACITY RESTORATION METHOD

CROSS-REFERENCE TO RELATED APPLICATIONS

This application is a U.S. National Stage entry of PCT Application No. PCT/JP2016/051474, filed on Jan. 19, 2016, which claims priority to Japanese Patent Application No. 2015-008412, filed Jan. 20, 2015, the contents of which are incorporated herein by reference.

TECHNICAL FIELD

The present invention relates to an exhaust gas purification system and a NOx purification capacity restoration method.

BACKGROUND ART

Conventionally, a NOx storage-reduction catalyst has been known as a catalyst to reduce and purify a nitrogen compound (NOx) in exhaust gases discharged from an internal combustion engine. This NOx storage-reduction catalyst stores NOx contained in exhaust gas when the exhaust gas is in a lean atmosphere and reduces and purifies the NOx that is stored therein with hydrocarbons contained in the exhaust gas when the exhaust gas is in a rich atmosphere to make the NOx harmless for discharge into the atmosphere. Since the NOx storage capacity of the catalyst is limited, a so-called NOx purge needs to be executed periodically in which exhaust gas is made rich by performing a post injection or an exhaust pipe injection to restore the NOx storage capacity of the catalyst (for example, refer to Patent Literature 1).

Additionally, a technology is proposed in which CO and HC emissions are suppressed while suppressing the deterioration of fuel economy to a minimum level in a case where a NOx trapping catalyst deteriorates greatly (for example, refer to Patent Literature 2).

PRIOR ART LITERATURES

Patent Literature

Patent Literature 1: JP-A-2008-202425
Patent Literature 2: JP-A-2007-239581

SUMMARY OF THE INVENTION

Problem That the Invention is to Solve

In general, a NOx purge is started when an elapsing time from the end of the NOx purge reaches a predetermined target interval. However, in case the target interval is set at a fixed value, when the NOx storage capacity of the catalyst is reduced due to deterioration with time or by heat, the NOx purge cannot be started effectively according to the degree of deterioration, causing a problem that the worsening of exhaust emissions is called for.

An exhaust gas purification system and a NOx purification capacity restoration method that the invention discloses herein are intended to prevent effectively the worsening of exhaust emissions by correcting a target interval of NOx purges according to the degree of deterioration of a catalyst.

Means for Solving the Problem

The invention discloses an exhaust gas purification system including:
a NOx storage-reduction catalyst that is provided on an exhaust passageway of an internal combustion engine to reduce and purify a nitrogen compound in exhaust gas;
deterioration degree estimation means for estimating a degree of deterioration of the NOx storage-reduction catalyst;
regeneration control means for executing a regeneration process in which the exhaust gas is enriched so as to restore a NOx storage capacity of the NOx storage-reduction catalyst;
target interval setting means for setting a target interval from an end of the regeneration process to a start of the subsequent regeneration process by the regeneration means; and
target interval correction means for correcting the target interval based on the degree of deterioration that is estimated by the deterioration degree estimation means.

Additionally, the invention discloses an exhaust gas purification system including:
a NOx storage-reduction catalyst that is disposed on an exhaust passageway of an internal combustion engine to store and reduce a nitrogen compound contained in exhaust gas discharged from the internal combustion engine; and
a control unit for controlling an air-fuel ratio of the exhaust gas discharged from the internal combustion engine, wherein
the control unit operates to execute the following processes:
a deterioration degree estimation process of estimating a degree of deterioration of the NOx storage-reduction catalyst;
a regeneration process of shifting the air-fuel ratio of the exhaust gas to a rich state to restore a NOx storage capacity of the NOx storage-reduction catalyst;
a target interval setting process of setting a target interval that is a time interval from an end of the regeneration process to a start of the subsequent regeneration process;
a target interval correction process of correcting the target interval, that is set through the target interval setting process, based on the degree of deterioration that is estimated through the deterioration degree estimation process; and
a regeneration repeating process of repeating the regeneration process when the target interval that is corrected through the target interval correction process is over after an end of the regeneration process.

The invention discloses a NOx purification capacity restoration method for an exhaust gas purification system that includes an internal combustion-engine and a NOx storage-reduction catalyst that is disposed on an exhaust gas passageway of the internal combustion engine to store and reduce a nitrogen compound contained in exhaust gas discharged from the internal combustion engine, the NOx purification capacity restoration method including:
a deterioration degree estimation process of estimating a degree of deterioration of the NOx storage-reduction catalyst;
a regeneration process of shifting an air-fuel ratio of the exhaust gas to a rich state to restore a NOx storage capacity of the NOx storage-reduction catalyst;
a target interval setting process of setting a target interval that is a time interval from an end of the regeneration process to a start of the subsequent regeneration process;

a target interval correction process of correcting the target interval, that is set through the target interval setting process, based on the degree of deterioration that is estimated through the deterioration degree estimation process; and a regeneration repeating process of repeating the regeneration process when the target interval that is corrected through the target interval correction process is over after an end of the regeneration process.

Advantageous Effect of the Invention

According to the exhaust gas purification system and the NOx purification capacity restoration method that the invention discloses herein, it is possible to prevent the worsening of exhaust emissions by correcting the target interval of NOx purges according to the degree of deterioration of the catalyst.

MODE FOR CARRYING OUT THE INVENTION

Hereinafter, an exhaust gas purification system according to an embodiment of the present invention will be described based on the accompanying drawings.

Figure 1:
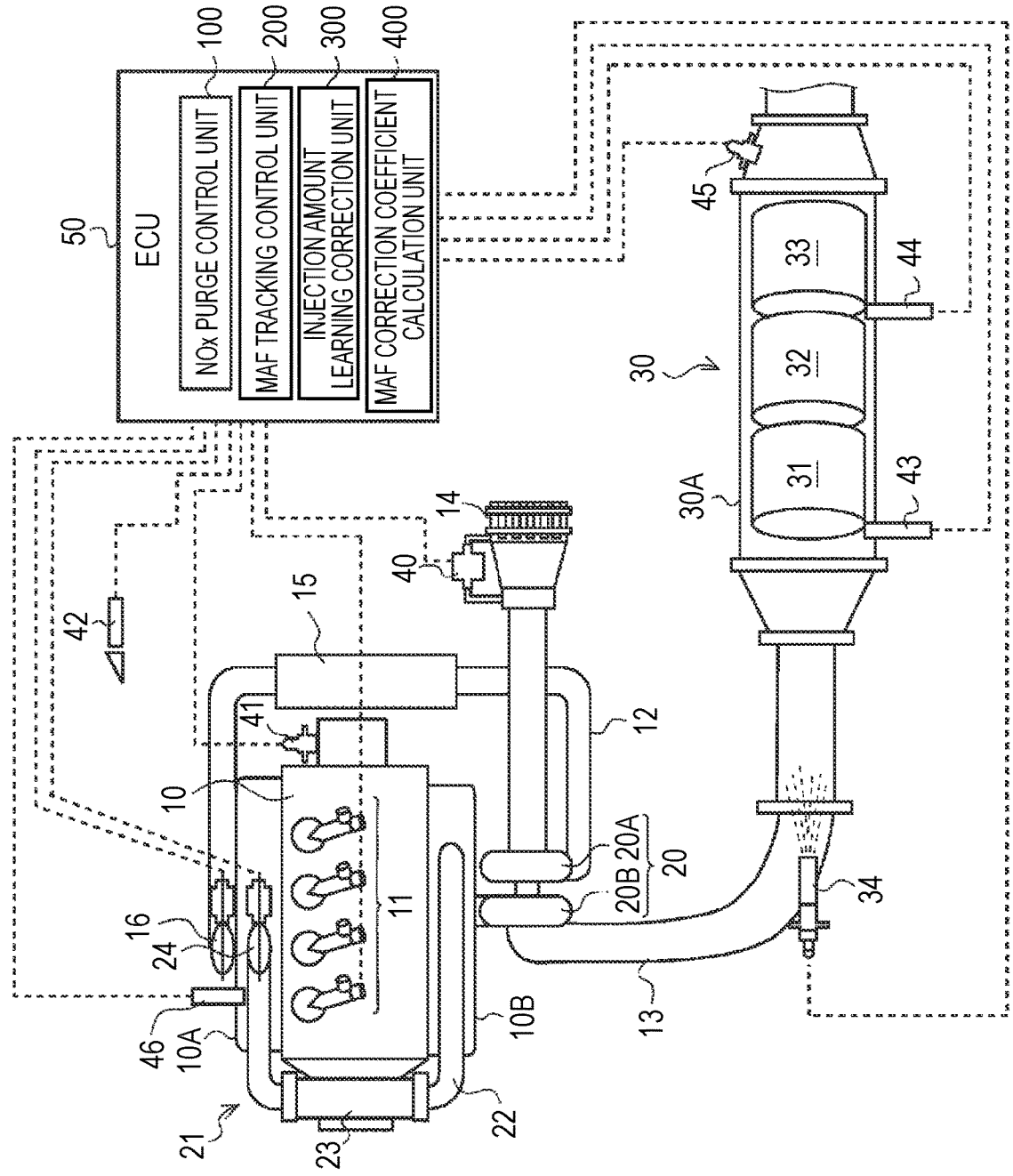
FIG. 1 is a schematic diagram showing m overall configuration of an exhaust gas purification system according to an embodiment of the present invention.

As shown in FIG. 1, injectors 11 are provided individually on cylinders of a diesel engine (hereinafter, referred to simply as an engine) 10 to inject highly pressurized fuel accumulated under pressure in a common rail, not shown, directly into the cylinders. A fuel injection amount and a fuel injection timing for each of these injectors 11 are controlled in response to an instruction signal inputted from an electronic control unit (hereinafter, referred to as an ECU) 50.

An intake passageway 12 through which fresh air is introduced is connected to an intake manifold 10A of the engine 10, and an exhaust passageway 13 through which exhaust emissions are discharged to an exterior portion is connected to an exhaust manifold 10B. An air cleaner 14, an intake air amount sensor (hereinafter, referred to as an MAF (Mass Air Flow) sensor) 40, a compressor 20A of a variable capacity supercharger 20, an inter-cooler 15, an intake throttle valve 16 and the like are provided along the intake passageway 12 sequentially in that order from an upstream side of an intake air flow. A turbine 20B of the variable capacity supercharger 20 and an exhaust gas after-treatment apparatus 30 and the like are provided along the exhaust passageway 13 sequentially in that order from an upstream side of an exhaust gas flow. An engine revolution speed sensor 41, an accelerator position sensor 42, and a boost pressure sensor 46 are attached to the engine 10.

In the description of this embodiment, the MAF sensor 40 for measuring and detecting a mass flow rate (Mass Air flow) is used as a sensor for measuring and detecting an engine intake air amount (intake air flow rate (Suction Air Flow)). However, a flow rate (Air Flow) sensor of a different type from the MAF sensor 40 or a means which replaces the flow rate sensor may be used, provided that they can measure and detect engine suction air flow.

An EGR device 21 includes an EGR passageway 22 which connects the exhaust manifold 10B and the intake manifold 10A, an EGR cooler 23 which cools EGR gas and an EGR valve 24 which controls an EGR amount.

The exhaust gas after-treatment apparatus 30 includes in a case 30A an oxidation catalyst 31, a NOx storage-reduction catalyst 32, and a particulate filter (hereinafter, referred to simply as a filter) 33 which are arranged sequentially in that order from an upstream side of an exhaust gas flow. In addition, an exhaust pipe injector 34 for injecting unburned fuel (mainly hydrocarbons (HC)) into the exhaust passageway 13 in response to an instruction signal inputted from the ECU 50 is provided on a portion of the exhaust passageway 13 which is situated upstream of the oxidation catalyst 31.

For example, the oxidation catalyst 31 is formed of a ceramic substrate carrier of a honeycomb structure which carries an oxidation catalyst component on a surface thereof. When supplied with unburned fuel through a post injection by the exhaust pipe injector 34 or the injectors 11, the oxidation catalyst 31 oxidizes the unburned fuel to increase the temperature of exhaust gas.

In the disclosure of the invention, fuel injection to shift an air-fuel ratio of exhaust gas to a rich state by injecting unburned fuel through at least either of an exhaust pipe injection by the exhaust pipe injector 34 and a post injection by the injectors 11 is generally referred to as "rich injection".

The NOx storage-reduction catalyst 32 is formed of a ceramic substrate carrier of a honeycomb structure which carries an alkaline metal on a surface thereof. This NOx storage-reduction catalyst 32 stores NOx in exhaust gas when an air-fuel ratio of the exhaust gas is in the lean state, and when the air-fuel ratio of the exhaust gas is in the rich state, the NOx storage-reduction catalyst 32 reduces and purifies the stored NOx with a reducing agent (HC) contained in the exhaust gas.

The filter 33 is formed by disposing a number of cells which are defined by porous bulkheads along a flowing direction of exhaust gas and sealing upstream ends and downstream ends of the cells in an alternate fashion. The filter 33 traps particulate matters (PM) in exhaust gas in fine holes and on surfaces of the bulkheads and a so-called forced filter regeneration in which the trapped PM are burned to be removed is executed when an estimated amount of accumulation of trapped PM reaches a predetermined amount. The forced filter regeneration is executed by supplying unhurried fuel to the oxidation catalyst 31, which is disposed at an upstream side, through an exhaust pipe injection or a post injection and raising the temperature of exhaust gas flowing into the filter 33 up to a PM combustion temperature.

A first exhaust gas temperature sensor 43 is provided upstream of the oxidation catalyst 31 and detects a temperature of exhaust gas that flows into the oxidation catalyst 31. A second exhaust gas temperature sensor 44 is provided between the NOx storage-reduction catalyst 32 and the filter 33 to detect a temperature of exhaust gas that flows into the filter 33. A NOx/lambda sensor 45 is provided downstream of the filter 33 and detects a NOx value and a lambda value (hereinafter, referred also to as an excess air factor) of exhaust gas which passes through the NOx storage-reduction catalyst 32.

The ECU 50 performs various controls of the engine 10 and the like and is made up of a known CPU, ROM, RAM, input port and output port. To enable the ECU 50 to perform the various controls, sensor values are inputted into the ECU 50 from the sensors 40 to 46. The ECU 50 has a NOx purge control unit 100, a MAF tracking control unit 200, an injection amount learning correction unit 300 and a MAF correction coefficient calculation unit 400 as part of its functional elements. These functional elements are described as being incorporated in the ECU 50, which is integrated hardware. However, some of the functional elements can also be provided on separate hardware.

NOx Purge Control

Figure 2:
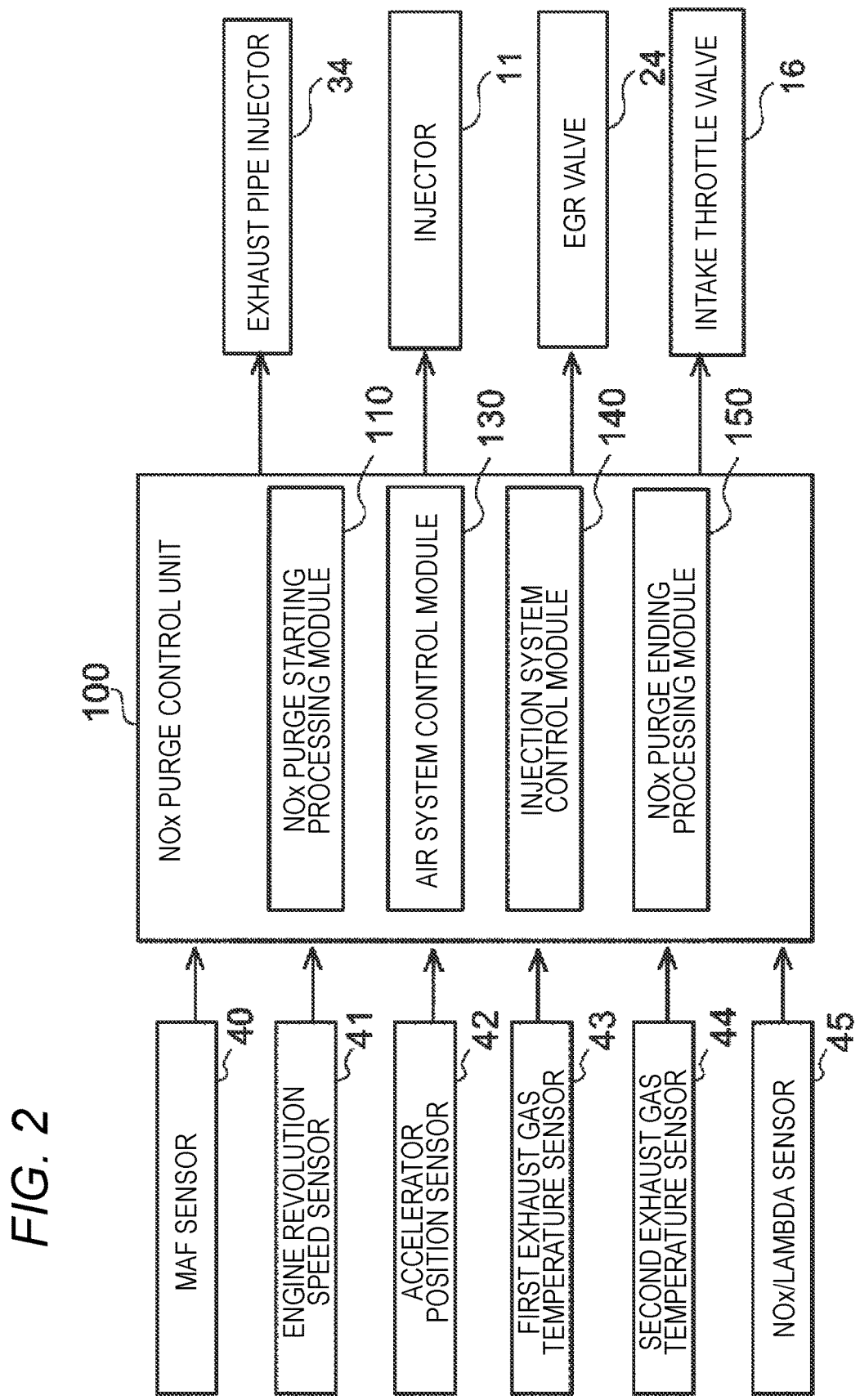
FIG. 2 is a functional block diagram showing a NOx purge control unit according to the embodiment of the present invention.

The NOx purge control unit 100 is a regeneration control means of the present invention and executes a regeneration process (hereinafter this process will be referred to as a NOx purge control) in winch exhaust gas is shifted to a rich atmosphere by controlling at least either of the section air flow and the fuel injection amount of the engine 10 so as to reduce and purify NOx stored in the NOx storage-reduction catalyst 32 to therein make the NOx into harmless for discharge, whereby the NOx storage capacity of the NOx storage-reduction catalyst 32 is restored. In this embodiment, the NOx purge control unit 100 includes, as shown in FIG. 2, a NOx purge starting processing module 110, an air system control module 130, an injection system control module 140 and a NOx purge ending processing module 150 as some of functional elements. Hereinafter, these functional elements will be described in detail.

NOx Purge Control Starting Process

Figure 3:
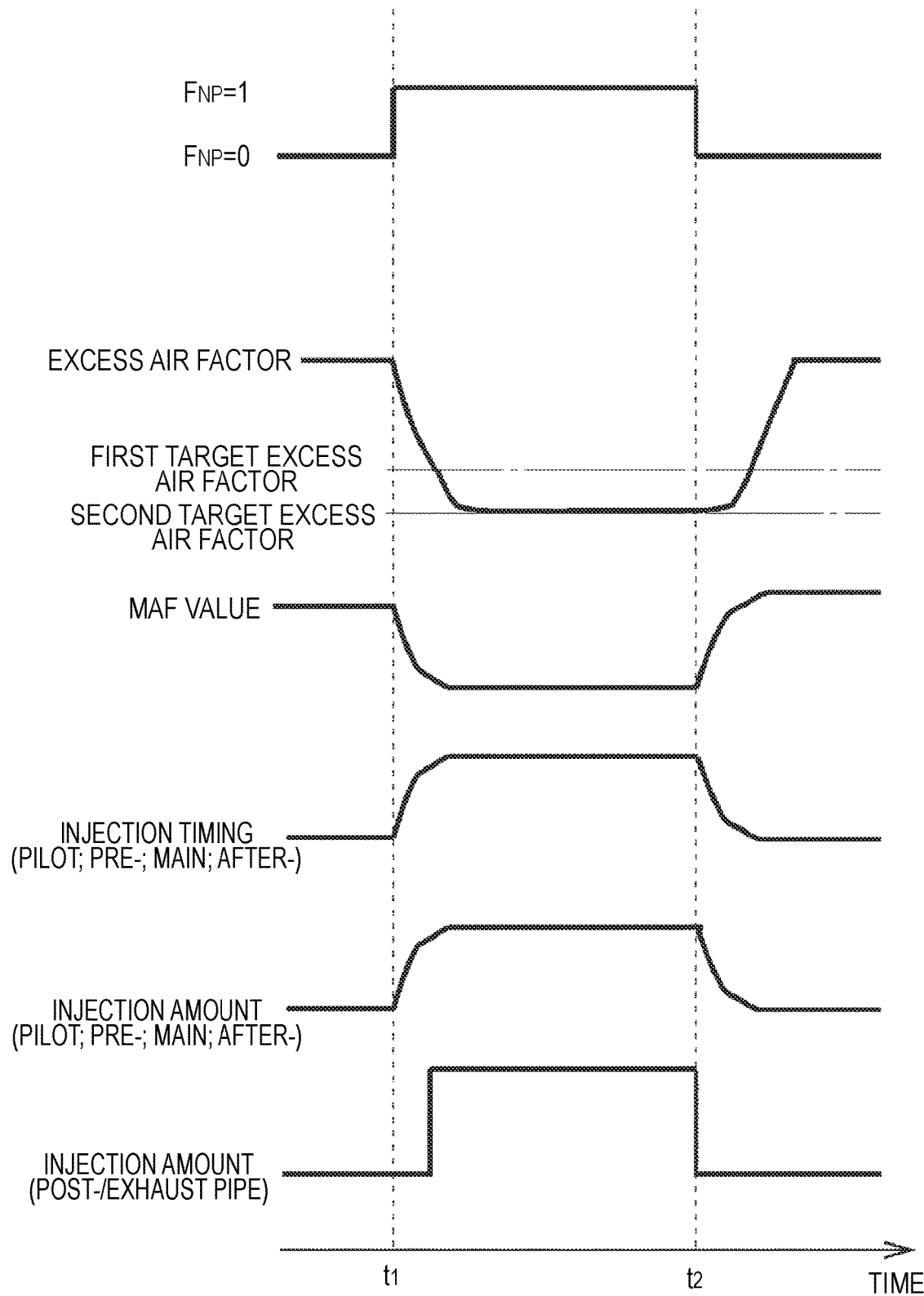
FIG. 3 is a timing chart illustrating a NOx purge control according to the embodiment of the present invention.
Figure 4:
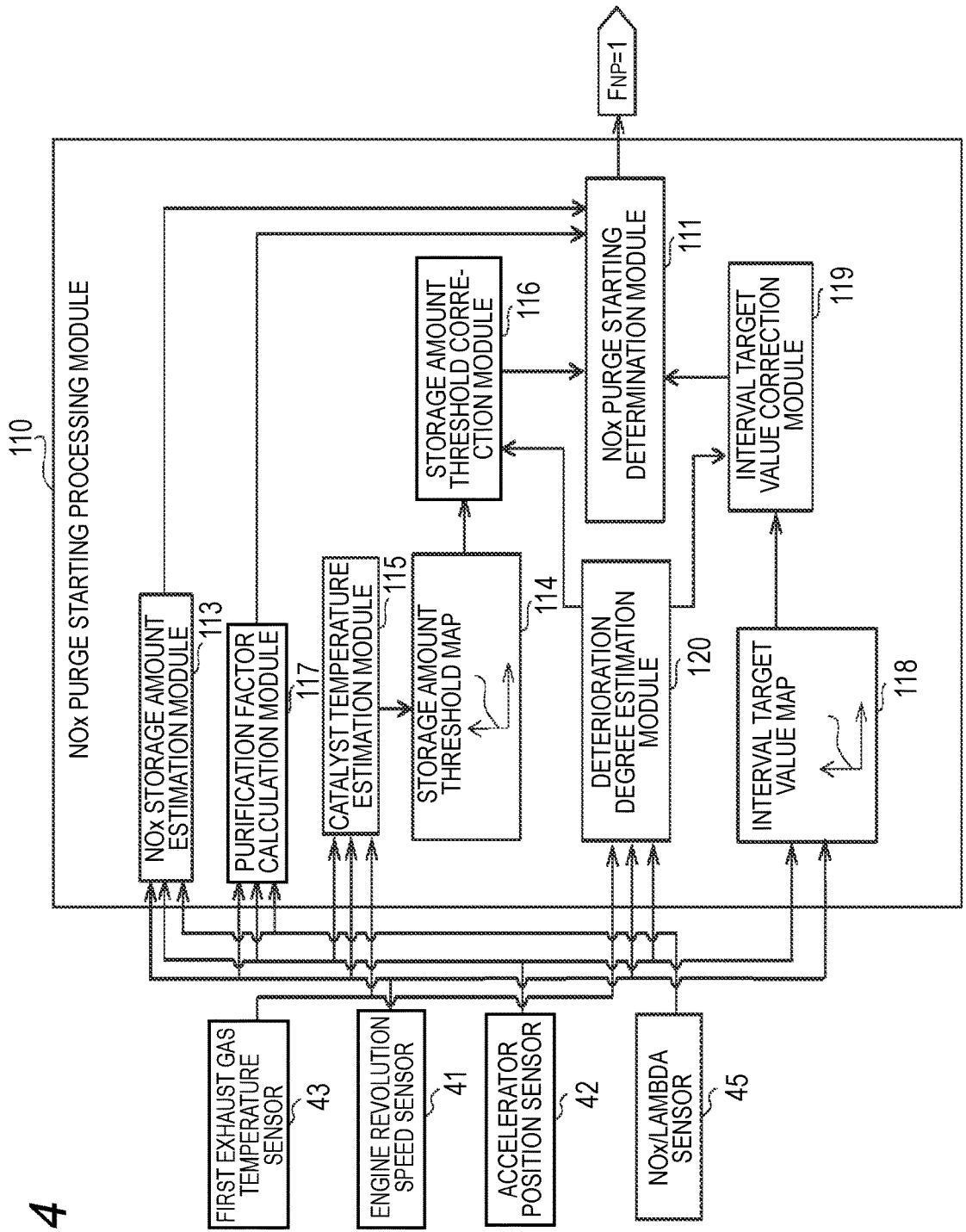
FIG. 4 is a block diagram showing a NOx purge control starting process according to the embodiment of the present invention.

FIG. 4 is a block diagram showing a starting process by the NOx purge starting processing module 110. The NOx purge starting determination module 111 sets a NOx purge flag $F_{NP}$ on ($F_{NP}=1$) when any one of the following three conditions is established: (1) a first starting condition that a NOx storage amount estimated value $m\_NOx$ of the NOx storage-reduction catalyst 32 reaches a predetermined NOx storage threshold $STR\_{thr\_NOx}$; (2) a second starting condition that a NOx purification factor $Pur\_{NOx}$ % of the NOx storage-reduction catalyst 32 is seduced to a predetermined purification factor threshold $Pur\_{thr\_NOx}$ %; and (3) a third starting condition that an elapsing time $Int\_{Time}$ counted by a timer incorporated in the ECU from the end of the previous NOx purge control matches a predetermined interval target value (a target interval) $Int\_{tgt}$, and starts a NOx purge control (refer to a time $t_1$ in FIG. 3).

The NOx storage amount estimated value $m\_NOx$ that is used for determination on the first starting condition is estimated by a NOx storage amount estimation module 113. The NOx storage estimated value $m\_NOx$ may be calculated based on a map or a model expression which includes, for example, an operating state of the engine 10 or a sensor value of the NOx/lambda sensor 45 as an input signal. The NOx storage amount threshold $STR\_{thr\_NOx}$ is set by a storage amount threshold map 114 which is referred to based on an estimated catalyst temperature $Temp\_{LNT}$ of the NOx storage-reduction catalyst 32. The estimated catalyst temperature $Temp\_{LNT}$ is estimated by a catalyst temperature estimation module 115. The estimated catalyst temperature $Temp\_{LNT}$ may be estimated based on, for example, an entrance temperature of the oxidation catalyst 31 that is detected by fee first exhaust gas temperature sensor 43 or an HC and CO heat values in interiors of the oxidation catalyst 31 and the NOx storage-reduction catalyst 32. The NOx storage amount threshold $STR\_{thr\_NOx}$ that is set based on the storage amount threshold map 114 is designed to be corrected by a storage amount threshold correction module 116, which will be described later in detail.

The NOx purification factor $NOx\_{pur}$ % for determination on the second starting condition is calculated by a purification factor calculation module 117. The NOx purification factor $NOx\_{pur}$ % may be obtained by dividing a NOx amount on a downstream side of the catalyst that is detected by the NOx/lambda sensor 45 by a NOx discharge amount-on an upstream side of the catalyst that is estimated from an operating state of the engine 10.

The interval target value $Int\_{tgt}$ that is used for determination on the third starting condition is set by an interval target value map 118 that is referred to based on an engine revolution speed Ne and a accelerator position Q. This interval target value $Int\_{tgt}$ is designed to be corrected by an interval target value correction module 119, which will be described in detail later.

Storage Amount Threshold Correction

A NOx storage capacity of the NOx storage-reduction catalyst 32 decreases as the NOx storage-reduction catalyst 32 is deteriorated progressively with time or by heat. Due to this, in case the NOx storage amount threshold $NOx\_{thr\_val}$ is set at a fixed value, it is not possible to ensure a frequency at which a NOx purge is executed according to the deterioration of the NOx storage-reduction catalyst 32 with time or by heat, thereby having a possibility leading to a risk of the worsening of exhaust emissions.

To prevent the worsening of exhaust emissions, the storage amount threshold correction module 116 executes a reduction correction in which the NOx storage amount threshold $NOx\_{thr\_val}$ that is set by the storage amount threshold map 114 is reduced as the degree of deterioration of the NOx storage-reduction catalyst 32 is increased. To describe this more specifically, this reduction correction is executed by multiplying the NOx storage amount threshold $NOx\_{thr\_val}$ by a deterioration correction coefficient (degree of deterioration) that is obtained by a deterioration degree estimation module 120. The deterioration correction coefficient may be obtained based on, for example, a reduction in HC and CO heat values in the interior of the NOx storage-reduction catalyst 32, a thermal history of the NOx storage-reduction catalyst 32, a reduction in NOx purification factor of the NOx storage-reduction catalyst 32 and a mileage of the vehicle.

Interval Target Value Correction

In case the interval target value $Int\_{tgt}$ is set at a fixed value, when the NOx storage-reduction catalyst 32 is deteriorated progressively with time or by heat, it is not possible to ensure the frequency at which NOx purges are carried out, thereby having a possibility leading to a risk of the worsening of exhaust emissions.

To prevent the worsening of exhaust-emissions like this, the interval target value correction module 119 executes a shortening correction in which an interval target value Int_$_{tgt}$ that is set by an interval target value map 118 is shortened as the degree of deterioration of the NOx storage-reduction catalyst 32 is increased. To describe this more specifically, this shortening correction is executed by multiplying the NOx storage amount threshold NOx_$_{thr\_val}$ by the deterioration correction coefficient (degree of deterioration) that is obtained by the deterioration degree estimation module 120. The deterioration correction coefficient may be obtained based on, for example, a reduction in HC and CO heat values in die interior of the NOx storage-reduction catalyst 32, a thermal history of the NOx storage-reduction catalyst 32, a reduction in NOx purification factor of the NOx storage-reduction catalyst 32 and a mileage of the vehicle.

NOx Purge Control Ending Process

Figure 5:
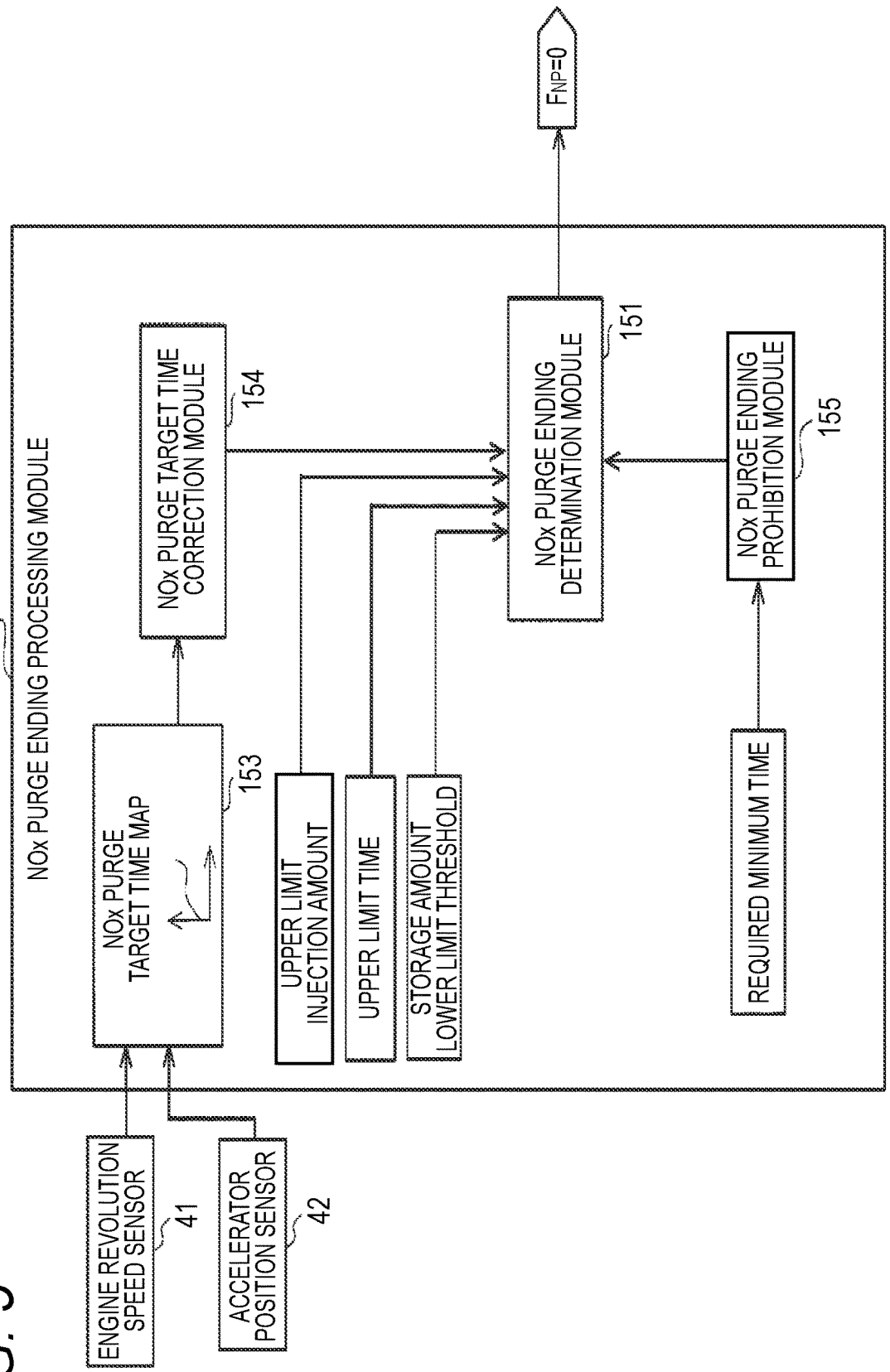
FIG. 5 is a block diagram showing a NOx purge control ending process according to the embodiment of the present invention.

FIG. 5 is a block diagram showing an ending process by the NOx purge ending processing module 150. A NOx purge ending determination module 151 ends the NOx purge control by setting the NOx purge flag FNP off (FNP=0) when anyone of the following four ending conditions is established: (1) a first ending condition that a NOx storage amount estimated value m NOx that is calculated by a NOx storage amount estimation module 113 (refer to FIG. 4) is reduced to a predetermined storage amount lower limit threshold; (2) a second ending condition that a total injection amount of the exhaust pipe injection or the post injection that is accumulated from the start of the NOx purge control reaches a predetermined upper limit injection amount; (3) a third ending condition that an elapsing time counted from the start of the NOx purge control reaches a predetermined upper limit time; and (4) a fourth ending condition that an elapsing time counted by the timer from the start of the NOx purge control reaches a predetermined NOx purge target time NP_Time_trg (refer to the time $t_2$ in FIG. 3).

The NOx purge target time (target regeneration time) NP_$_{Time\_trg}$ that is used for determination on the fourth ending condition is set by a NOx purge target time map 153 that is referred to based on the engine revolution speed Ne and the accelerator position Q. The NOx purge target time NP_$_{Time\_trg}$ is corrected by a NOx purge target time correction module 154, which will be described in detail later.

A NOx purge ending prohibition module 155 prohibits a NOx purge ending determination module 152 from ending the NOx purge control until the elapsing time counted from the start of the NOx purge control reaches a predetermined required minimum time. This required minimum time is set at a time that is longer than a time during which a control operation by the air system control or the MAF tracking control, which will be described later, is completed and shorter than the upper limit time used for determination made under the ending condition (3) described above.

In this way, in this embodiment, even though the ending conditions (1) to (4) are met, the NOx purge control is designed to continue until the elapsing time from the start of the NOx purge control reaches the required minimum time. This prevent the occurrence of a malfunction that is triggered as a result of the various control operations such as the air system control or the injection system control and the MAF tracking control that are started for NOx purging being stopped in an unfinished state.

NOx Purge Target Time Correction

The NOx storage capacity of the NOx storage-reduction catalyst 32 deteriorates as the NOx storage-reduction catalyst deteriorates progressively with time or by heat, and therefore, unless the degree of deterioration of the catalyst is reflected to the NOx purge target time NP_$_{Time\_trg}$, the fuel supply amount becomes excessive, thereby leading to a possibility that a so-called HC slip is brought about which is a phenomenon in which hydrocarbons simply pass through the catalyst and are discharged.

To prevent the occurrence of the HC slip, the NOx purge target time correction module 154 executes a shortening correction in which the NOx purge target time NP_$_{Time\_trg}$ that is set by the NOx purge target time map 153 is shortened as the degree of deterioration of the NOx storage-reduction catalyst 32 is increased. To describe this more specifically, this shortening correction is executed by multiplying the NOx purge target time NP_$_{Time\_trg}$ by the deterioration correction coefficient that is obtained by the deterioration degree estimation module 120 (refer to FIG. 4).

NOx Purge Lean Control

When the NOx purge flag $F_{NP}$ is set on, the air system control module 130 executes a NOx purge lean control in which the excess air factor is reduced from an excess air factor for a steady-state driving (for example, about 1.5) to a first target excess air factor (for example, about 1.3) that is closer to the lean side than a value (about 1.0) corresponding to the stoichiometric air-fuel ratio. Hereinafter, the NOx purge lean control will be described in detail.

Figure 6:
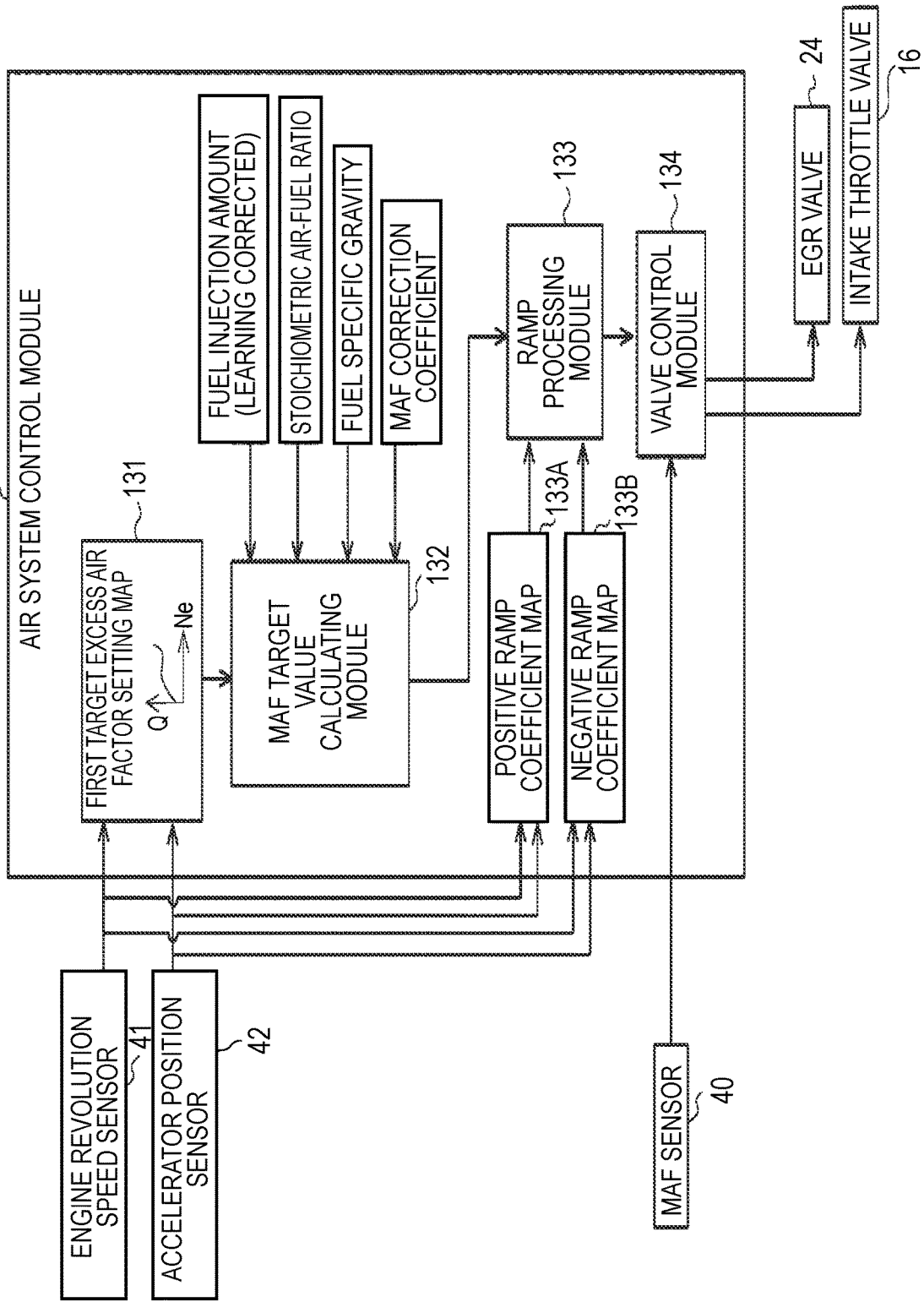
FIG. 6 is a block diagram showing MAF target value setting process in executing a NOx purge lean control according to the embodiment of the present invention.

FIG. 6 is a block diagram showing a MAF target value, MAF$_{NPL\_Trgt}$, setting process in executing a NOx purge lean control. A first target excess air factor setting map 131 is a map that is referred to based on an engine revolution speed Ne and an accelerator position Q, and excess air factor target values $\lambda_{NPL\_Trgt}$ (first target excess air factors) corresponding to engine revolution speeds Ne and accelerator positions Q in executing a NOx purge lean control are set in advance based on experiments in the map.

Firstly, an excess air factor target value $\lambda_{NPL\_Trgt}$ for use in executing the NOx purge lean control is read from the first target excess air factor setting map 131 based on an engine revolution speed Ne and an accelerator position Q as input signals and is then inputted into a MAF target value calculating module 132. Further, in the MAF target value calculating module 132, a MAF target value MAF$_{NPL\_Trgt}$ for use in a NOx purge lean control is calculated based on the following expression (1).

$$MAF_{NPL\_Trgt} = \lambda_{NPL\_Trgt} \times Q_{fnl\_corrd} \times Ro_{Fuel} \times AFR_{sto} / Maf_{corr} \quad (1)$$

In the expression (1), $Q_{fnl\_corrd}$ denotes a fuel infection amount (excluding post injection), which will be described later, on which a learning correction has been performed, $Ro_{Fuel}$ denotes a fuel specific gravity, $AFR_{sto}$ denotes the stoichiometric air-fuel ratio, and $Maf_{corr}$ denotes a MAF correction coefficient, which will be described later.

A MAF target value MAF$_{NPL\_Trgt}$ that is calculated by the MAF target value calculating module 132 is inputted into a ramp processing module 133 when the NOx purge flag $F_{NP}$ set is on (refer to the time $t_1$ in FIG. 3). The ramp processing module 133 reads a ramp coefficient from a positive ramp coefficient map 133A and a negative ramp coefficient map 133B based on an engine revolution speed Ne and a accelerator position Q as input signals and inputs a MAF target ramp value $MAF_{NPL\_Trgt\_Ramp}$ to which the read ramp coefficient is added into a valve control module 134.

The valve control module 134 executes a feedback control in which the intake throttle valve 16 is controlled to be closed while the EGR valve 24 is controlled to be opened so that an actual MAF value $MAF_{Act}$ inputted from the MAF sensor 40 becomes the MAF target ramp value $MAF_{NPL\_Trgt\_Ramp}$.

In this way, in this embodiment, the MAF target value $MAF_{NPL\_Trgt}$ is set based on the excess air factor target value $\lambda_{NPL\_Trgt}$ that is read from the first target excess air factor setting map 131 and the fuel injection amounts of the individual injectors 11, so that the operation of the air intake system is feedback control led based on the MAF target value $MAF_{NPL\_Trgt}$. By doing so, the exhaust gas can be reduced effectively to a desired excess air factor that is necessary for the NOx purge lean control without providing a lambda sensor on the upstream side of the NOx storage-reduction catalyst 32 or without using a sensor value of the lambda sensor even when the lambda sensor is provided on the upstream side of the NOx storage-reduction catalyst 32.

Additionally, the MAF target value $MAF_{NPL\_Trgt}$ can be set through a feedforward control by using a fuel injection amount $Q_{fnl\_corrd}$ on which a learning correction has been performed as the fuel injection amount of each of the injectors 11, thereby making it possible to eliminate effectively the influence resulting from the deterioration with age or property variation of the individual injectors 11.

In addition, the deterioration in drivability that would be caused by a misfire or torque variation of the engine 10 resulting from a dramatic change in the amount of intake air can be prevented effectively by adding a ramp factor that is set according to the running condition of the engine 10 to the MAF target value $MAF_{NPL\_Trgt}$.

Fuel Injection Amount Setting for NOx Purge Rich Control

When the NOx purge flag $F_{NP}$ is set on, the injection system control module 140 executes a NOx purge rich control in which the excess air factor is reduced from the first target excess air factor to a second target excess air factor (for example, about 0.9) on the rich side. Hereinafter, the NOx purge rich control will be described in detail.

Figure 7:
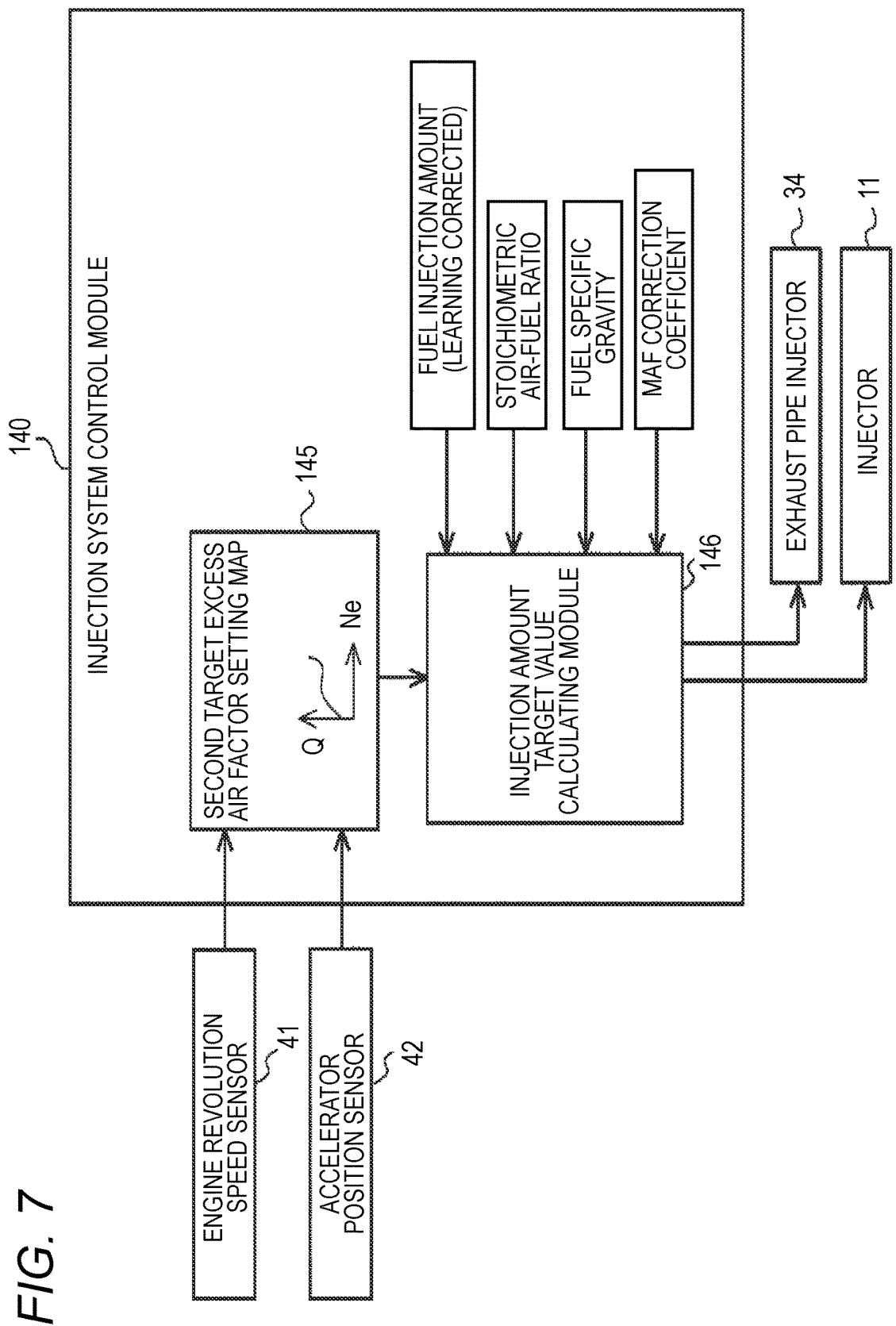
FIG. 7 is a block diagram showing a target injection amount setting process in executing a NOx purge rich control according to the embodiment of the present invention.

FIG. 7 is a block diagram showing a setting process of a target injection amount $Q_{NPR\_Trgt}$ (an injection amount per unit time) for an exhaust pipe injection or a post injection in the NOx purge rich control. A second target excess air factor setting map 145 is a map that is referred to based on an engine revolution speed Ne and a accelerator position Q, and excess air factor target values $\lambda_{NPR\_Trgt}$ (the second target excess air factor) corresponding to engine revolution speeds Ne and accelerator positions Q for use in executing the NOx purge rich control are set in advance based on experiments in the map.

Firstly, an excess air factor target value $\lambda_{NPR\_Trgt}$ for use in executing the NOx purge rich control is read from the second target excess air factor setting map 145 based on an engine revolution speed Ne and an accelerator position Q as input signals and is then inputted into an injection amount target value calculating module 146. Further, in the injection amount target value calculating module 146, a target infection amount $Q_{NPR\_Trgt}$ for use in the NOx purge rich control is calculated based on the following expression (2).

$$Q_{NPR\_Trgt} = MAF_{NPL\_Trgt} \times Maf\_{corr}/(\lambda_{NPR\_Trgt} \times Ro_{Fuel} \times AFR_{sto}) - Q_{fnl\_corrd} \quad (2)$$

In the expression (2), $MAF_{NPL\_Trgt}$ denotes a NOx purge lean MAF target value and is inputted from the MAF target value calculating module 132. In addition, $Q_{fnl\_corrd}$ denotes a fuel injection amount (excluding post injection), which will be described later, on which a learning correction has been performed and to which a MAF tracking control has not yet been applied, $Ro_{Fuel}$ denotes a fuel specific gravity, $AFR_{sto}$ denotes the stoichiometric air-fuel ratio, and $Maf\_{corr}$ denotes a MAF correction coefficient, which will be described later.

When the NOx purge flag $F_{NP}$ is set on, a target injection amount $Q_{NPR\_Trgt}$ calculated by the injection amount target value calculating module 146 is transmitted to the exhaust pipe injector 34 or the individual injectors 11 as an injection instruction signal (refer to the time $t_1$ in FIG. 3). The injection instruction signal is kept transmitted until the NOx purge flag $F_{NP}$ is set off (a time $t_2$ in FIG. 3) by the determination on the end of the NOx purge control, which will be described later.

In this way, in this embodiment, the target injection amount $Q_{NPR\_Trgt}$ is designed to be set based on the excess air factor target value $\lambda_{NPR\_Trgt}$ that is read from the second target excess air factor setting map 145 and amounts of fuel injected from the individual injectors 11. By doing so, the exhaust gas can be reduced effectively to a desired excess air factor that is necessary for the NOx purge rich control without providing a lambda sensor on the upstream side of the NOx storage-reduction catalyst 32 or without using a sensor value of the lambda sensor even when the lambda sensor is provided on the upstream side of the NOx storage-reduction catalyst 32.

Additionally, the target injection amount $Q_{NPR\_Trgt}$ can be set through a feedforward control by using the fuel injection amount $Q_{fnl\_corrd}$ on which a learning correction has been performed as the fuel injection amount of each of the injectors 11, thereby making it possible to eliminate effectively the influence resulting from the deterioration with age or property variation of each of the injectors 11.

MAF Tracking Control

The MAF tracking control unit 200 executes a control (a MAF tracking control) to correct a fuel injection timing and a fuel injection amount of each of the injectors 11 during the following periods of time: (1) a period of time when the normal lean operating state is switched to the rich operating state by executing the NOx purge control; and (2) the rich operating state by executing the NOx purge control is switched to the normal lean operating state.

Injection Amount Learning Correction

Figure 8:
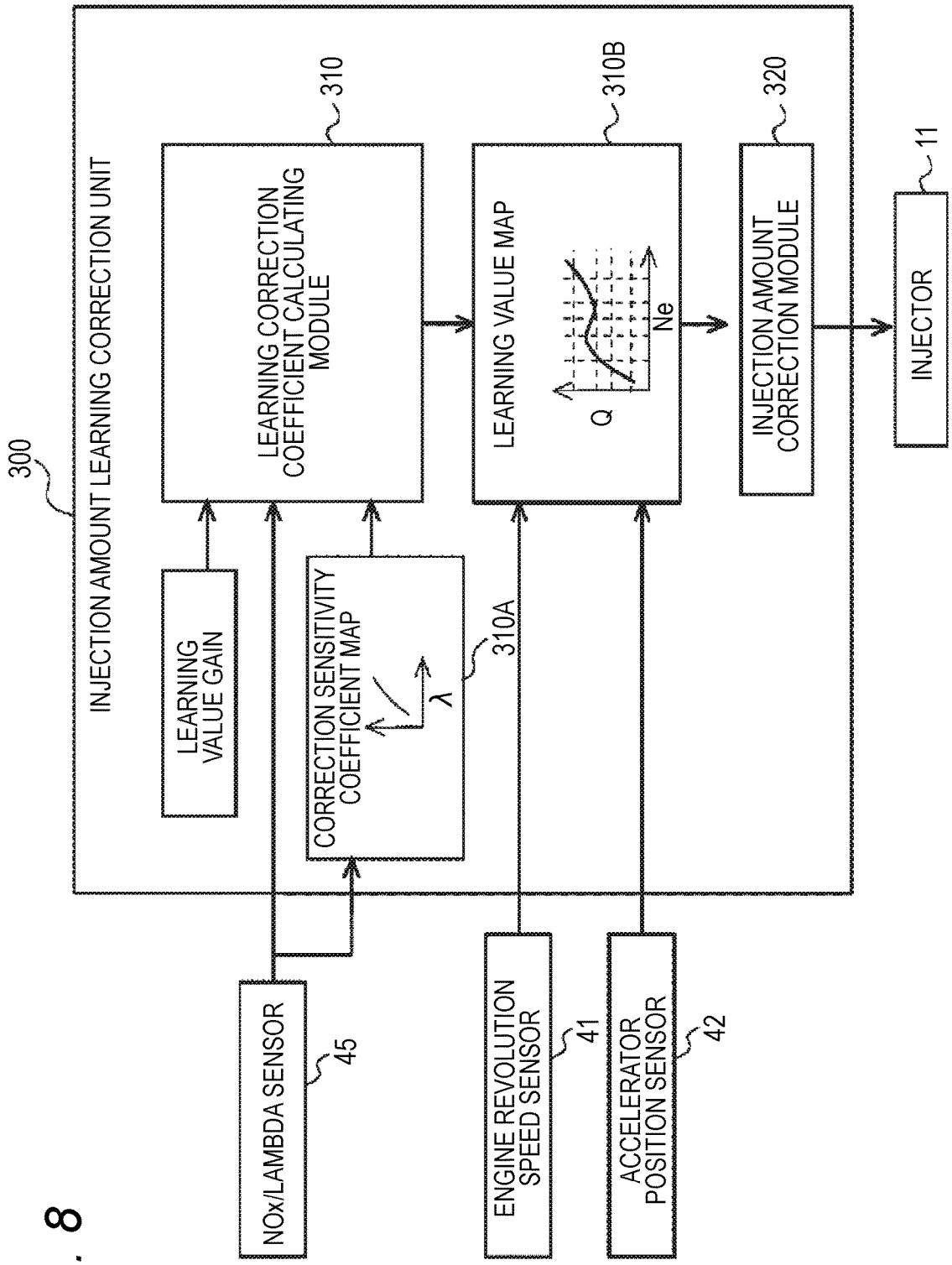
FIG. 8 is a block diagram showing an injection amount learning correction process for injectors according to the embodiment of the present invention.

As shown in FIG. 8, the injection amount learning correction unit 300 has a learning correction coefficient calculating module 310 and an injection amount correction module 320.

Figure 9:
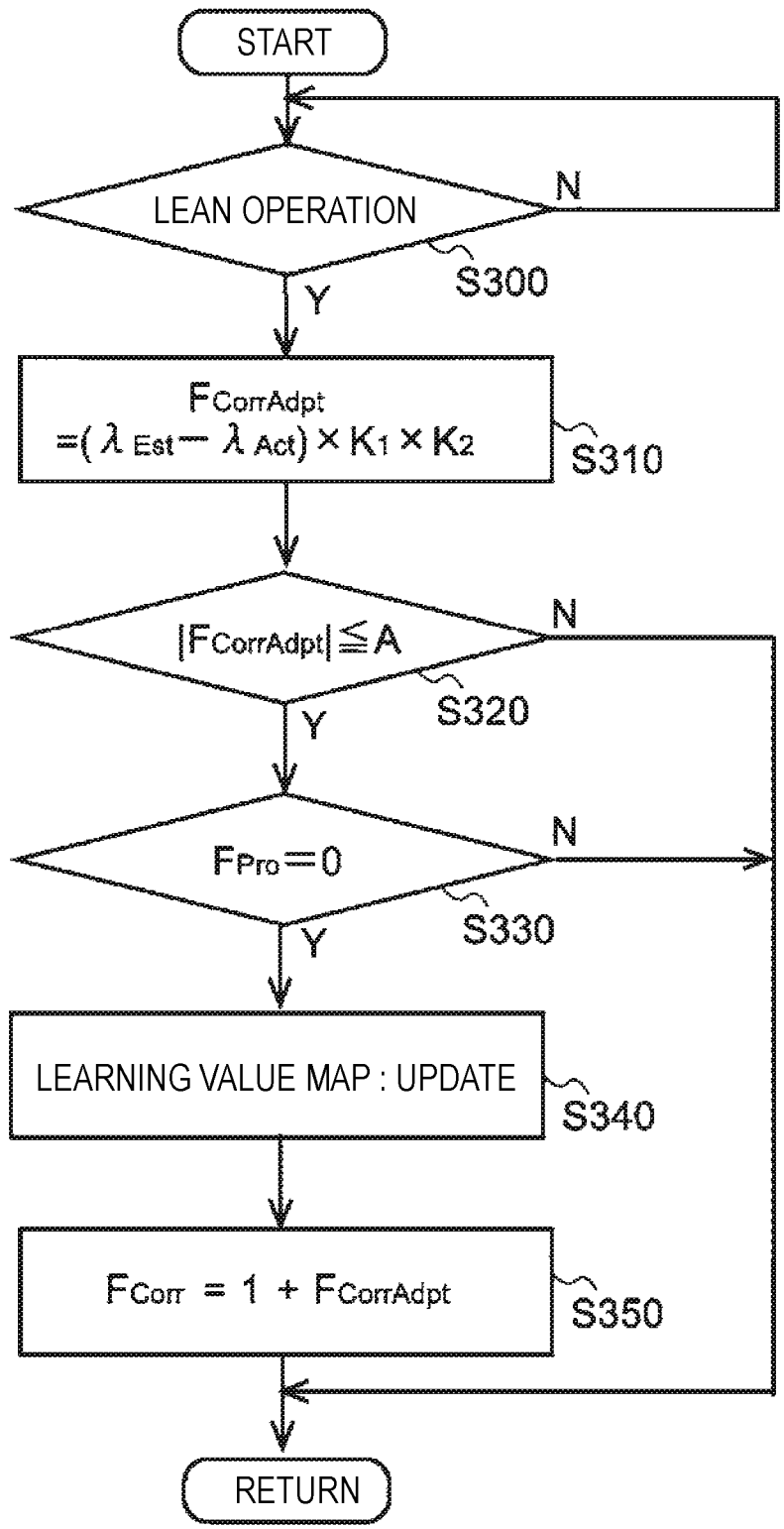
FIG. 9 is a flow chart illustrating a calculation process of a learning correction coefficient according to the embodiment of the present invention.

The learning correction coefficient calculating module 310 calculates a learning correction coefficient $F_{Corr}$ for a fuel injection amount based on an error $\Delta\lambda$ between an actual lambda value $\lambda_{Act}$ that is detected by the NOx/lambda sensor 45 when the engine 10 operates in a lean state, and an estimated lambda value $\lambda_{Est}$. Since the concentration of HC in exhaust gas is low when the exhaust gas is in lean state, a change in exhaust gas lambda value due to an oxidation reaction of HC in the oxidation catalyst 31 is so little as to be ignored. Due to this, it is considered that the actual lambda value $\lambda_{Act}$ in exhaust gas that passes through the oxidation catalyst 31 to be detected by the NOx/lambda sensor 45 of the downstream side coincides with the estimated lambda value $\lambda_{Est}$ in exhaust gas discharged from the engine 10. Namely, in case an error $\Delta\lambda$ is caused between the actual lambda value $\lambda_{Act}$ and the estimated lambda value $\lambda_{Est}$, it can be assumed that the error $\Delta\lambda$ is caused by a difference between an instructed infection amount given to each of the injectors 11 and an actual injection amount therefrom. Hereinafter, a calculation process of a learning correction coefficient that is executed using the error $\Delta\lambda$ by the learning correction coefficient calculation module 310 will be described based on a flow chart as shown in FIG. 9.

In step S300, it is determined based on an engine revolution speed Ne and an accelerator position Q whether or not the engine 10 is operating in the lean state. If it is determined that the engine 50 is operating in the lean state, the flow proceeds to step S310 to start a calculation of a learning correction coefficient.

In step S310, an error $\Delta\lambda$ that is obtained by subtracting an actual lambda value $\lambda_{Act}$ detected by the NOx/lambda sensor 45 from an estimated lambda value $\lambda_{Est}$ is multiplied by a learning value gain $K_1$ and a correction sensitivity coefficient $K_2$ to thereby calculate a learning value $F_{CorrAdpt}$ ($F_{CorrAdpt}=(\lambda_{Est}-\lambda_{Act})\times K_1\times K_2$). The estimated lambda value $\lambda_{Est}$ is estimated and calculated from the operating state of the engine 10 that corresponds to fee engine revolution speed Ne and the accelerator position Q. The correction sensitivity coefficient $K_2$ is read from a correction sensitivity coefficient map 310A shown in FIG. 8 using the actual lambda value $\lambda_{Act}$ detected by the NOx/lambda sensor 45 as an input signal.

In step S320, it is determined whether or not an absolute value $|F_{CorrAdpt}|$ of the learning value $F_{CorrAdpt}$ is within a range of a predetermined correction limit value A. If it is determined that the absolute value $|F_{CorrAdpt}|$ exceeds the correction limit value A, this control is caused to return to end the current learning.

In step S330, it is determined whether or not a learning prohibition flag $F_{Pro}$ is off. As an example of a case where the learning prohibition flag $F_{Pro}$ is set on, a transient operation and a NOx purge control operation ($F_{NP}=1$) of the engine 10 can be raised. The reason that the determination above is made is that in such a state that those conditions are met, the error $\Delta\lambda$ becomes great due to the change in actual lambda value $\lambda_{Act}$ to thereby make it impossible to execute an accurate learning. In determining, whether or not the engine 10 is in a transient operating state, for example, in case a variation with time of the actual lambda value $\lambda_{Act}$ that is detected by the NOx/lambda sensor 45 is greater than a predetermined threshold, it may be determined based on the variation with time that the engine 10 is in the transient operating state.

In step S340, a learning value map 310B (refer to FIG. 8) that is referred to based on the engine revolution speed Ne and the accelerator position Q is updated to the learning value $F_{CorrAdpt}$ that is calculated in step S310. To be more specific, a plurality of learning areas, which are defined according to engine revolution speeds Ne and accelerator positions Q, are set on the learning value map 310B. These learning areas are preferably set so that those tending to be used more frequently are narrower whereas others tending to be used less frequently are wider. By setting the learning areas in that way, the learning accuracy is improved in the areas tending to be used more frequently, and the occurrence of no learning can be prevented effectively in the areas tending to be used less frequently.

In step S350, a learning correction coefficient $F_{Corr}$ is calculated by adding "one" to a learning value that is read from the learning value map 310B using the engine revolution speed Ne and the accelerator position Q as input signals ($F_{Corr}=1+F_{CorrAdpt}$). This learning correction coefficient $F_{Corr}$ is inputted into an injection amount correction module 320 shown in FIG. 8.

The injection amount correction module 320 executes corrections of fuel injection amounts for a pilot injection $Q_{Pilot}$, a pre-injection $Q_{Pre}$, a main injection $Q_{Main}$, an after-injection $Q_{After}$, and a post injection $Q_{Post}$ by multiplying basic injection amounts for those injections by the learning correction coefficient $F_{Corr}$.

In this way, it is possible to eliminate effectively variations resulting from the deterioration with age or property variation of each of the injectors 11 or the individual difference thereof by correcting the fuel injection amounts of the injectors 11 with a learning value corresponding to an error $\Delta\lambda$ between an estimated lambda value $\lambda_{Est}$ and an actual lambda value $\lambda_{Act}$.

MAF Correction Coefficient

The MAF correction coefficient calculation unit 400 calculates a MAF correction coefficient Maf_$_{corr}$ that is used for setting a MAF target value $MAF_{NPL\_trgt}$ or a target injection amount $Q_{NPR\_Trgt}$ for use in executing the NOx purge control.

In this embodiment, the fuel injection amount of each of the injectors 11 is corrected based on an error $\Delta\lambda$ between an actual lambda value $\lambda_{Act}$ detected by the NOx/lambda sensor 45 and an estimated lambda value $\lambda_{Est}$. However, since lambda is a ratio of air to fuel, the cause for the error $\Delta\lambda$ is not always the influence resulting from the difference between the instructed injection amount given to each of the injectors 11 and the actual injection amount therefrom. Namely, it is possible that not only errors of the injectors 11 but also an error of the MAF sensor 40 influences the lambda value error $\Delta\lambda$.

Figure 10:
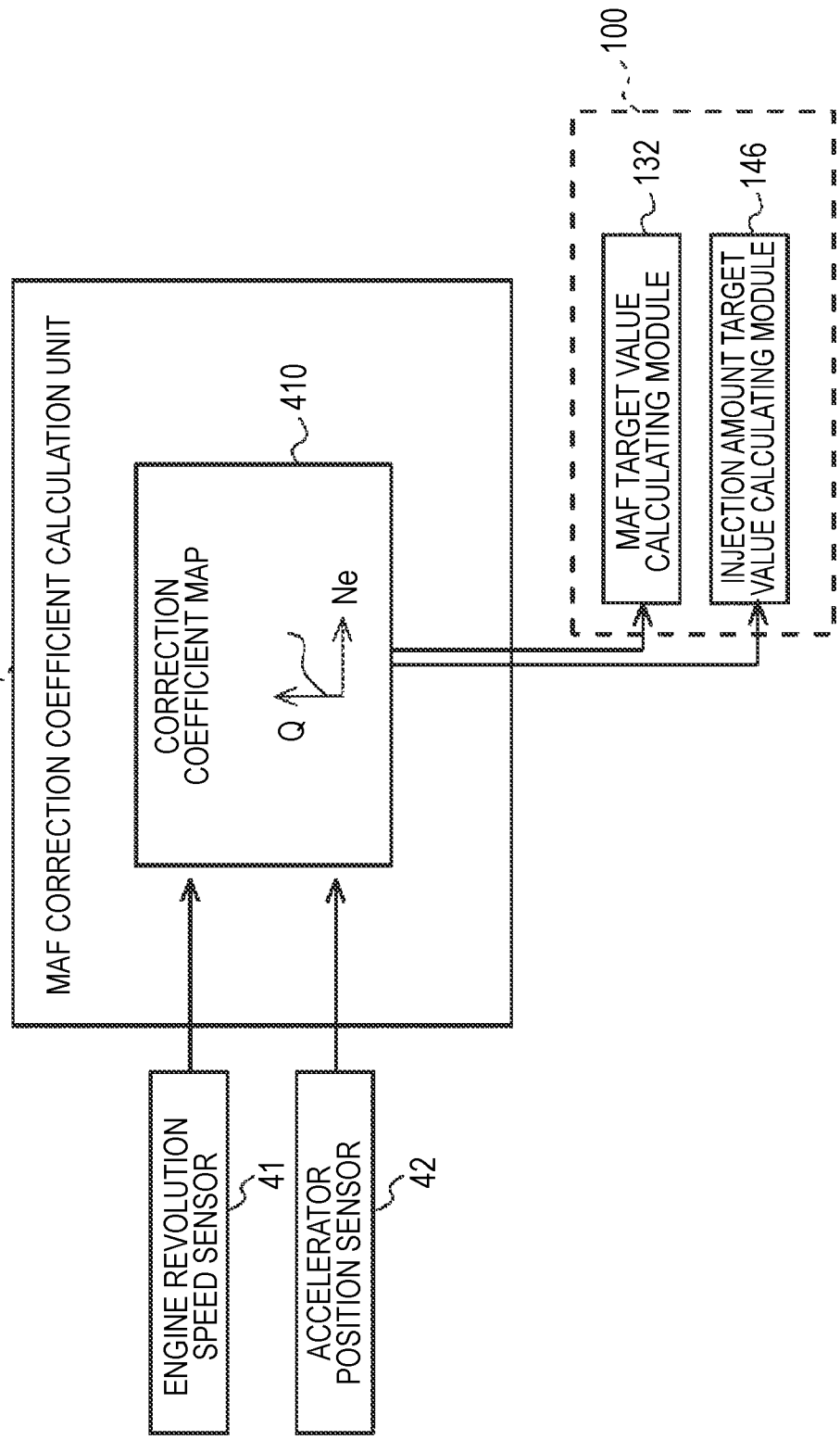
FIG. 10 is a block diagram showing a MAF correction coefficient setting process according to the embodiment of the present invention.

FIG. 10 is a block diagram showing a setting process of a MAF correction coefficient Maf_$_{corr}$ by the MAF correction coefficient calculation unit 400. A correction coefficient setting map 410 is a map that is referred to based on an engine revolution speed Ne and a accelerator position Q, and MAF correction coefficients Maf_$_{corr}$ indicating sensor properties of the MAF sensor 40 corresponding to engine revolution speeds Ne and accelerator positions Q are set is advance through experiments in the map.

The MAF correction coefficient calculation unit 400 reads a MAF correction coefficient Maf_$_{corr}$ from the correction coefficient setting map 410 using an engine revolution speed Ne and a accelerator position Q as input signals and transmits this MAF correction coefficient Maf_$_{corr}$ to the MAF target value calculating module 132 and the injection amount target value calculating module 146. By doing so, it is possible to reflect effectively the sensor properties of the MAF sensor 40 to the setting of the MAF target value $MAF_{NPL\_Trgt}$ and the target injection amount $Q_{NPR\_Trgt}$ for use in executing the NOx purge control.

Other Examples

The invention is not limited to the embodiment that has been described heretofore and hence can be carried out by being modified as required without departing from the spirit and scope of the invention.

This patent application is based on Japanese Patent Application (No. 2015-008412) filed on Jan. 20, 2015, the contents of which are incorporated herein by reference.

INDUSTRIAL APPLICABILITY

The exhaust gas purification system and the NOx purification capacity restoration method according to the invention have the advantage that it is possible to prevent effectively the worsening of exhaust emissions by correcting the target interval of NOx purges according to the degree of deterioration of the catalyst and are useful in purifying effectively exhaust gas discharged from the internal combustion engine.

DESCRIPTION OF REFERENCE NUMERALS

10 Engine
11 Injector
12 Intake passageway
13 Exhaust passageway
16 Intake throttle valve
24 EGR valve
31 Oxidation catalyst
32 NOx storage-reduction catalyst
33 Filter
34 Exhaust pipe injector
40 MAF sensor
45 NOx/lambda sensor
50 ECU

The invention claimed is:

1. An exhaust gas purification system comprising:
a NOx storage-reduction catalyst that is provided on an exhaust passageway of an internal combustion engine to reduce and purify a nitrogen compound in exhaust gas; and
a control unit configured to:
estimate a degree of deterioration of the NOx storage-reduction catalyst;
execute a regeneration process in which the exhaust gas is enriched so as to restore a NOx storage capacity of the NOx storage-reduction catalyst;
set a target interval from an end of the regeneration process to a start of a subsequent regeneration process;
correct the target interval based on the estimated degree of deterioration; and
prohibit an end of a NOx regeneration control until an elapsing time counted from a start of the NOx regeneration control reaches a required minimum time that is longer than a time during which a control operation by an air system or a MAF (mass air flow) tracking control is completed.

2. The exhaust gas purification system according to claim 1, wherein
the control unit shortens the target interval more as the estimated degree of deterioration becomes greater.

3. The exhaust gas purification system according to claim 2, wherein
the control unit sets a target regeneration time from a start of the regeneration process to an end of the regeneration process, and
the control unit corrects the target regeneration time based on the estimated degree of deterioration.

4. The exhaust gas purification system according to claim 1, wherein
the control unit sets a target regeneration time from a start of the regeneration process to an end of the regeneration process, and
the control unit corrects the target regeneration time based on the estimated degree of deterioration.

5. The exhaust gas purification system according to claim 4, wherein
the control unit shortens the target regeneration time more as the estimated degree of deterioration becomes greater.

6. An exhaust gas purification system comprising:
a NOx storage-reduction catalyst that is disposed on an exhaust passageway of an internal combustion engine to store and reduce a nitrogen compound contained in exhaust gas discharged from the internal combustion engine; and
a control unit for controlling an air-fuel ratio of the exhaust gas, wherein
the control unit is configured to execute:
a deterioration degree estimation process of estimating a degree of deterioration of the NOx storage-reduction catalyst;
a regeneration process of shifting the air-fuel ratio to a rich state to restore a NOx storage capacity of the NOx storage-reduction catalyst;
a target interval setting process of setting a target interval that is a time interval from an end of the regeneration process to a start of a subsequent regeneration process;
a target interval correction process of correcting the target interval based on the estimated degree of deterioration;
a regeneration repeating process of repeating the regeneration process when the corrected target interval is over after an end of the regeneration process; and
a prohibiting process for prohibiting an end of a NOx regeneration control until an elapsing time counted from a start of the NOx regeneration control reaches a required minimum time that is longer than a time during which a control operation by an air system or a MAF (mass air flow) tracking control is completed.

7. A NOx purification capacity restoration method for an exhaust gas purification system that includes an internal combustion engine and a NOx storage-reduction catalyst that is disposed on an exhaust gas passageway of the internal combustion engine to store and reduce a nitrogen compound contained in exhaust gas discharged from the internal combustion engine, the NOx purification capacity restoration method comprising:
estimating a degree of deterioration of the NOx storage-reduction catalyst;
executing a regeneration process by shifting an air-fuel ratio of the exhaust gas to a rich state to restore a NOx storage capacity of the NOx storage-reduction catalyst;
setting a target interval that is a time interval from an end of the regeneration process to a start of a subsequent regeneration process;
correcting the target interval based on the estimated degree of deterioration;
repeating the regeneration process when the corrected target interval is over after an end of the regeneration process; and
prohibiting an end of a NOx regeneration control until an elapsing time counted from a start of the NOx regeneration control reaches a required minimum time that is longer than a time during which a control operation by an air system or a MAF (mass air flow) tracking control is completed.

* * * * *